United States Patent [19]

Aubry

[11] Patent Number: 5,266,005
[45] Date of Patent: Nov. 30, 1993

[54] ROTOR HEAD FOR ROTARY WING AIRCRAFT

[75] Inventor: Jacques A. Aubry, Cabries, France

[73] Assignee: Aérospatiale Société Nationale Industrielle, Paris, France

[21] Appl. No.: 766,924

[22] Filed: Sep. 27, 1991

[30] Foreign Application Priority Data

Sep. 27, 1990 [FR] France .................. 90 11950

[51] Int. Cl.[5] .................................... B64C 27/51
[52] U.S. Cl. ..................... 416/106; 416/134 A; 416/140
[58] Field of Search ............. 416/98, 103, 104, 106, 416/107, 134 A, 140, 141

[56] References Cited

U.S. PATENT DOCUMENTS

| 1,948,457 | 2/1934 | Larsen | 416/106 |
|---|---|---|---|
| 2,155,427 | 4/1939 | Larsen | 416/106 |
| 2,516,781 | 7/1950 | Magrum et al. | |
| 3,967,918 | 7/1976 | Mouille et al. | 416/141 |
| 4,178,130 | 12/1979 | Ferris et al. | 416/107 |
| 4,361,415 | 11/1982 | Aubry | 416/134 A |
| 4,732,540 | 3/1988 | Mouille et al. | 416/140 A |
| 5,007,799 | 4/1991 | Mouille et al. | 416/104 |

FOREIGN PATENT DOCUMENTS

| 2530182 | 1/1977 | Fed. Rep. of Germany ... 416/140 A |
|---|---|---|
| 2427251 | 12/1979 | France . |
| 2592449 | 7/1987 | France . |
| 643875 | 9/1950 | United Kingdom . |

Primary Examiner—Edward K. Look
Assistant Examiner—James A. Larson
Attorney, Agent, or Firm—Nikaido, Marmelstein, Murray & Oram

[57] ABSTRACT

A rotor head for a rotary wing aircraft rotor blades, such that each blade is coupled to the hub by an attachment assembly. The attachment assembly includes a thrust bearing attached to the hub for allowing angular oscillations, and drag damping device coupled between the blade and the hub for damping movements of drag caused by rotation of the rotor head. The drag damping device has hydro-elastic elements which are pivotable with respect to each other about a common axis. The damping device as also disposed to pivot in a flapping direction of the blade through a pivot joint.

43 Claims, 7 Drawing Sheets

ROTOR HEAD FOR ROTARY WING AIRCRAFT

BACKGROUND OF THE INVENTION

The present invention relates to a rotor head for rotary wing aircraft. The rotor head includes a hub to which each rotor blade is coupled by articulation means which allow angular oscillations of flapping and orientation in pitch of the blade and pivoting movements in drag of the blade about a common center which is fixed with respect to the body of the hub. Each blade is also associated with at least one device for damping the drag movements; the damping device is mounted on the rotor head.

DESCRIPTION OF THE PRIOR ART

Rotor heads of this type are already known and have been described in, for instance, the applicant's U.S. Pat. Nos. 4,304,525 and 4,407,633. These patents teach rotors for rotary wing aircraft which include a hub onto which each of the blades of the rotor are articulated by the intermediary of a laminated spherical thrust bearing which simultaneously serves as a means of withstanding centrifugal forces, and as a means of articulation in pitch, drag and flapping. This laminated spherical thrust bearing is mounted on a plate which constitutes the body of the hub in the upper section of the rotor mast. The plate is traversed by openings produced regularly on its periphery, substantially parallel to the axis of rotation of the rotor mast. Each opening bears a laminated spherical thrust bearing which serves as a means of holding and of articulation of a blade of the rotor. This bearing is located on the edge of the opening which is most distant from the axis of the rotor. The offset edges of these openings therefore support radial braces which are outer with respect to the axis of rotation of the rotor of these laminated spherical thrust bearings, whose inner braces are produced by parts forming cross-pieces mounted between the two arms of forked attachment pieces carrying at their other end the foot of the corresponding blade. The two arms of each attachment piece are disposed on either side of the median plane of the blade associated with the attachment piece.

A rotor head whose hub is provided with two plates disposed one above the other as a prolongation or extension of a central shaft have also been described in the patents mentioned above. Between these two plates there is mounted, for each blade, a cross-piece serving as an outer brace for a laminated spherical thrust bearing associated with the blade. The blade is connected to the inner brace of the laminated spherical thrust bearing by the intermediary of an attachment piece hollowed out to allow the free passage of the spherical thrust bearing. The attachment piece ends on the side of the hub with two arms extending laterally on either side of the spherical thrust bearing and joining together at the level of the inner brace.

Each of the blades of the rotor heads described in these two documents is associated with a built-in elastic return damping strut of the blade in drag. This strut is of the linear hydroelastic damping type and is articulated laterally with respect to the blade between the blade and said hub.

Other rotor heads of this type have also been described in U.S. Pat. Nos. 4,749,339 and 4,732,540 by the applicant. The hub and the rotor mast of these rotor heads form a single part whose tubular body is traversed by at least one of the arms of each forked blade-carrying attachment piece, at the level of openings produced regularly on a periphery of the tubular body. The contour of this single part allows the movements of pitch, drag and flapping of the attachment piece which is associated with therewith. Each portion of the tubular body, between the two openings associated with the two arms of a same attachment piece in the embodiments of U.S. Pat. No. 4,749,339, or between the opening associated with one of the arms of said forked attachment piece and the edge of the tubular body in U.S. Pat. No. 4,732,540, carries the outer brace of the laminated spherical thrust bearing associated with the attachment piece. The outer brace is carried at or toward the interior of the tubular body.

Each blade is also associated with a device intended to dampen its drag movements, which is of the hydroelastic damping strut type. The damping strut is articulated, on the one hand, on the hub and, on the other hand, on the attachment piece in its section located inside the tubular body.

Such linear damping devices have several structural disadvantages. In particular, because of their bulk, it proves difficult to adapt them to rotors with a large number of blades (4 to 5 blades and more). On such rotors these linear dampers could in fact only be disposed substantially along the attachment piece, approximately parallel to the radial axis of the attachment piece corresponding to the longitudinal axis thereof. In such a mounting structure, the elastic return and damping struts would only be stressed in drag with a very small lever arm with respect to the center of articulation of the blade. The damping and elastic return produced by these struts would therefore generally be unsatisfactory, unless the stiffness of their return were increased, which results in the struts having a complex structure and a prohibitive bulk.

Undesirable couplings result because it is not possible to sufficiently incline the axis of the damper to the axis of the blade such that the center of articulation of the damper on the hub is situated on a proper axis. The proper axis is one passing both through the center of flapping of the blade and through the center of articulation of the pitch control rod on the pitch lever of the corresponding blade.

A purpose of the invention is therefore to overcome these various disadvantages. In particular, the invention incorporates rotary type drag damper in the attachment piece of each blade. Such a rotary damper can be of the hydroelastic damping type described in the U.S. Pat. No. 4,768,630 by the applicant and comprises a coaxial arrangement of a rotor and stator provided with vanes which are alternately integral with the rotor and with the stator. These vanes delimit several compartments in a main chamber filled with viscous fluid and are provided with laminar flow orifices for the fluid. These compartments are located inside the damper, and are delimited with covers closing the damper in a direction which is transverse with respect to the axis of the rotor and the stator. The viscous fluid passes from one compartment to another of the main chamber during a relative movement of the rotor and stator units. Other rotary dampers can also be utilized, particularly rotary dampers with visco-elastic damping.

With respect to this matter, the applicant has already proposed, in U.S. Pat. No. 4,361,415, to integrate a visco-elastic damper constituted by stratified layers of elastomer mounted between a outer brace. The outer brace is a stirrup, integral with the hub with regard to its rotational movements about the axis of the rotor. Inner braces are also provided, which are constituted by metal cheeks fixed to the attachment piece. The attachment piece is articulated by the intermediary of a laminated spherical thrust bearing onto the body of the hub. The angular drag movements of each blade are therefore impeded by the abovementioned stirrup and their oscillations are filtered by the laminated damper; the elastomer layers deform in shear and cause an elastic return of the blade while simultaneously providing a damping of the corresponding oscillation movements. The assembly constituted by the stirrup, the stratified layers of elastomers, and the cheeks of the attachment piece serve as an inner brace and consequently constitute a damper of the rotary type whose pivoting axis passes through the center of the laminated spherical thrust bearing and is substantially perpendicular to the median plane of the cheeks and of the stirrups.

However, this damper structure has the disadvantage of applying strong shear stresses to the section of the attachment piece which serves a brace for the damper. This section undergoes, in addition to stresses as a brace, the forces applied on the attachment piece by the blade integrally mounted at its end. It therefore becomes necessary to regularly inspect and replace the attachment pieces of the blades. Other major disadvantages of this structure also derive from the fact that the parts which form it have a complicated annular contour and are therefore difficult to produce. Another major disadvantage exists in that its installation is rendered relatively complex because of the bulk of these various parts around the laminated spherical thrust bearing.

Another purpose of the invention is therefore to also overcome these disadvantages. For this purpose it proposes the integration in an attachment piece of a damping assembly of the rotary type whose elements are not constituent elements of the attachment piece. Furthermore, the invention allows avoidance of coupling between the movements of drag, pitch and flapping encountered with linear dampers on rotors having a large number of blades.

In particular, the invention proposes rotor head structures in which the blade drag movements are damped by the intermediary of rotary type damping devices in which the relative movements of the units which form them are rotations about a pivoting axis which does not pass through the center of the laminated spherical thrust bearing. The proposed rotor head structures therefore render the various movements of pitch, drag and flapping of the blades compatible with such damping.

The rotor head of the present invention therefore comprises a hub to which each rotor blade is coupled. Each blade could be coupled by the intermediary of an attachment piece, by means of articulation such as a laminated spherical thrust bearing which allows the angular oscillations of flapping and the orientation in pitch of the blade. The thrust bearing also allows the blade to move in alternating angular movements of drag about a common center rotating with the blades of the rotor about the axis of the rotor and fixed with respect to the body of the hub. The blade is associated with a damping device for damping the movements of drag mounted between the blade and said hub. The device comprises two units capable of pivoting relatively about a common axis. The relative movement of the units is damped hydro-elastically, wherein one of the units is mounted on one of the two elements which constitute the blade or its attachment elements which constitute the blade or its attachment piece. The other of the units is articulated with respect to an articulation point on the other of the elements. This is in order to retain in drag a constant angular orientation with respect to the straight line joining the articulation point to the relative pivoting axis of the units. At least one of the units is capable of movement of translation with respect to the element onto which it is articulated to allow the adaptation of the distance separating the pivoting axis and the drag center and/or of the distance separating the pivoting axis and the articulation point at the drag position of the blade. One of the units of the damping device associated with the blade is mounted on the hub and articulated in a pivoting manner with respect to at least one axis of the hub. The other of the units is mounted or articulated on the blade or its attachment piece and drives the first of the units in a flapping manner about the axis during the flapping movements of the blade. The kinematic chain which connects the units of the damping device to the hub and to the blade or its attachment piece can comprise at least one ball joint and one pivot joint about an axis which is not parallel to the relative pivoting axis of the units. One of the units of a damping device can be connected to one of the elements of the assembly constituted by the hub and a blade or its attachment piece through a connecting piece articulated on the unit or the element through a ball joint. The connecting piece can be capable of a movement of translation with respect to the center of the ball joint. The connecting piece can be provided with an end rod mounted in a complementary bore traversing a ball capable of pivoting about its center. The center is fixed with respect to the element or the unit on which the ball is mounted. The rod is capable of sliding in its complementary bore. The center of the ball joint can be fixed with respect to the blade or its attachment piece. A blade and its attachment piece can be two separate parts; the blade is integral with the attachment piece by the fitting of its foot into an end fork with which the attachment piece is provided. The bottom of the fork receives the ball on which the connecting piece is articulated. The ball is capable of pivoting about its center which is substantially fixed with respect to the base.

According to a preferred embodiment, one of the units of the damping device is articulated by a ball joint on the element on which it is mounted. The other of the units is articulated on the element on which it is mounted through a pivot joint which pivots about an axis which is fixed with respect to the element. The axis of the pivot joint can be perpendicular to the relative pivot axis of the units. One of the units of the damping device is articulated by a pivot joint on the hub body, the other of the units is articulated by a ball joint on the blade or the attachment piece associated with the blade.

According to another preferred embodiment, one of the units of a damping device is fixed with respect to one of the elements of the assembly formed by the hub and the blade or its attachment piece, the other of the units is articulated on the other of said elements through at least one ball joint. The articulation of the second of the units on second of the elements can be achieved through a connecting piece articulated on one of the unit and of the element through a ball joint and on the other through a pivot joint. The connecting piece can be a stirrup which can be articulated by its arms in a pivoting manner about an axis which is fixed with respect to one of the units of the damping device. Alternatively, the stirrup can be articulated on the hub through a ball joint. The stirrup can be provided with a rod at a central section thereof, with the rod being fitted into a complementary bore provided in a ball joint capable of pivoting about its center which is fixed with respect to the hub; the rod is capable of sliding in the bore. The stirrup can be associated with means which allow a slight offset of its arm with respect to the axis of pivoting on the unit of the damping device on which it is articulated, in order to accompany the pitch movements of the blade and possibly of its attachment piece. The means can comprise ball joints between the arms of the stirrup and the axis of the pivot joint.

Each blade can be coupled to the hub through an attachment piece having a forked end. The means of articulation of the blade on said hub being achieved by a single laminated spherical thrust bearing mounted between an outer radial brace integral with the hub and an inner radial brace disposed as a cross-piece between the inner radial end arms of the attachment piece. The outer brace can be mounted on a reinforcing belt surrounding the body of the hub. The belt can have a U-shaped cross-section whose arms extend from the base of said belt substantially radially towards the outside of the body of the hub. A reinforced belt can have a polygonal contour with rounded points and having small equal sides alternating with large equal sides. The small sides carry the outer braces of the laminated thrust bearings associated with the blades. The outer brace also has a substantially U-shaped cross-section with branches directed radially towards the outside can be fitted into a small side of the belt, and can be associated with a cover. This cover is integral with the arms of the outer brace and closes the open section of said outer brace and of said small side of the U-shaped cross-section of the belt. The cover can bear, by the intermediary of two lugs with which it is provided, a shaft on which one of the units of the damping device is articulated in a pivoting manner about the axis of the shaft. The cover can also be provided with a hollowing or space for receiving a ball capable of pivoting inside of the space about its center which is fixed with respect to the cover.

As stated earlier, the damping device associated with a blade can be mounted inside the attachment piece of the blade. One of the units of the damping device can be a stator unit whose inside walls delimit an envelope having a principal shape of revolution. The other of the units is a rotor unit capable of pivoting coaxially inside the envelope. The stator unit can be articulated or mounted on the hub, the rotor unit being articulated or mounted on the blade or on its attachment piece. The relative pivoting movements of the stator and rotor units are advantageously hydroelastically damped; the envelope of the stator unit and the walls of the rotor unit facing the envelope together delimit a main chamber filled with fluid. The envelope and the facing walls are provided with vanes which divide the main chamber into a plurality of volumes. The vanes are associated with laminar flow means of the fluid through the various volumes of the main chamber, the main chamber being in communication with at least one auxiliary chamber having a variable volume intended to compensate for the expansion of the fluid. The laminar flow means comprise at least one laminar flow orifice traversing a vane within its thickness. The vane is included between two vanes without orifices associated with that one of the rotor and stator units which does not bear the first vane. A throttling orifice can be associated with a spring leaf which closes it in its rest position and allows the passage of the fluid into the orifice above a predetermined differential pressure threshold between the two compartments delimited by the vane in the main chamber. A vane can be traversed by two orifices whose axes are substantially distributed over one of its heights. Each of the vanes associated with the rotor unit is traversed by at least one throttling orifice allowing communication between the two compartments which it delimits in the main chamber. The extreme faces delimiting the main chamber and between which the envelope of the stator unit and the facing walls of the rotor unit are mounted can be the faces of annular rings integral with the walls delimiting the envelope, with the vanes of the rotor unit moving between the rings. The communication between an auxiliary chamber and the main chamber can be obtained by circulation of the fluid between the inside annular edge of at least one of the rings and the portion of outer wall of the rotor unit which faces it.

The auxiliary chamber is, in a preferred embodiment, disposed inside the rotor unit. The auxiliary chamber is delimited partly by an unrolling membrane mounted on a piston pushed back by a spring in compression in order to adapt the volume of the auxiliary chamber to possible variations in the volume of fluid and to maintain the hydraulic rotary damper under a sufficient pressure under static load conditions. An unrolling membrane can be mounted in a hollowing or space which is coaxial with the stator and rotor units, closed in a fluid-tight manner at one of its ends and in the other end of which the piston is mounted coaxially. A vane can be constituted by two fins side by side, each one traversed by two laminar flow orifices, the orifices of the fins of a same vane facing each other; one of the orifices of a fin associated with a spring leaf, and facing an orifice which is not selectively closed by a spring leaf. The vanes of the rotor unit each comprise, for example, two fins side by side.

The spring leaves associated with a same vane can be disposed inside the hollowing delimited by the two fins forming the vane, being offset in height with respect to each other.

In another advantageous embodiment, the auxiliary chamber is delimited at least partially by the outer surfaces of the rings delimiting the extreme faces of the main chamber and at least partially by an elastically deformable membrane. Each annular ring can be associated with an elastically deformable membrane, the damping device being provided with an auxiliary chamber towards each of its ends in the height of the stator and rotor units. An elastically deformable membrane has an annular shape. The inside annular edge of a membrane can be surrounded with an inside ring and an outside ring, to which rings the membrane is integrally attached by vulcanization.

Advantageously, the rotor unit is mounted between the two arms of a fork connecting it to the blade or to the attachment piece of the blade. The arms of the fork can be in one piece with the attachment piece. The fork can be the connection piece.

BRIEF DESCRIPTION OF THE DRAWINGS

The following description is purely illustrative and non-limiting. It must be read with reference to the appended drawings, wherein.

DESCRIPTION OF THE PREFERRED EMBODIMENT

Figure 1:
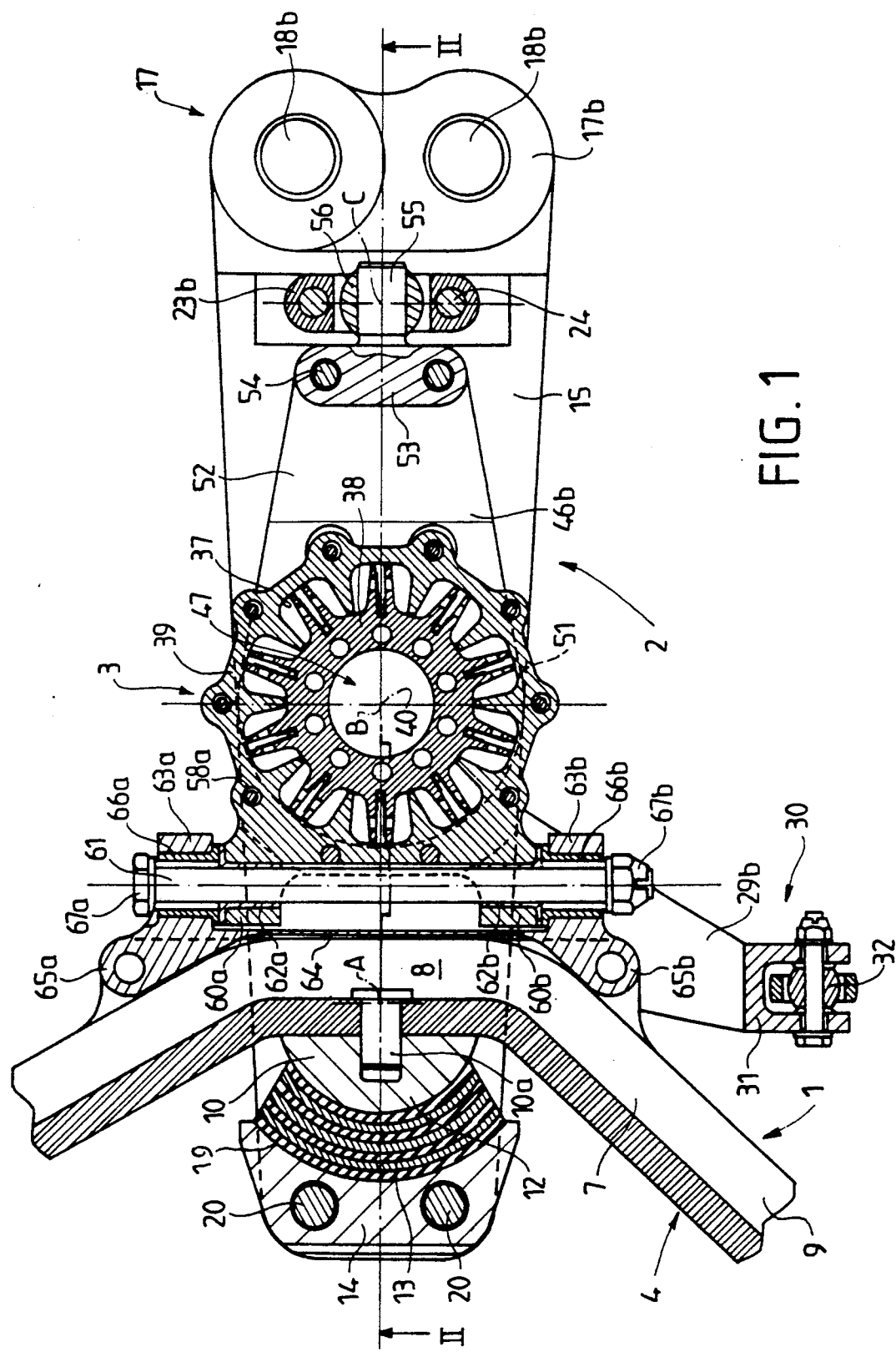
FIG. 1 is a diagrammatic cross-sectional view with partial cut-away of the hub of a rotor head according to the invention and of an attachment piece of a blade associated with the hub.
Figure 2:
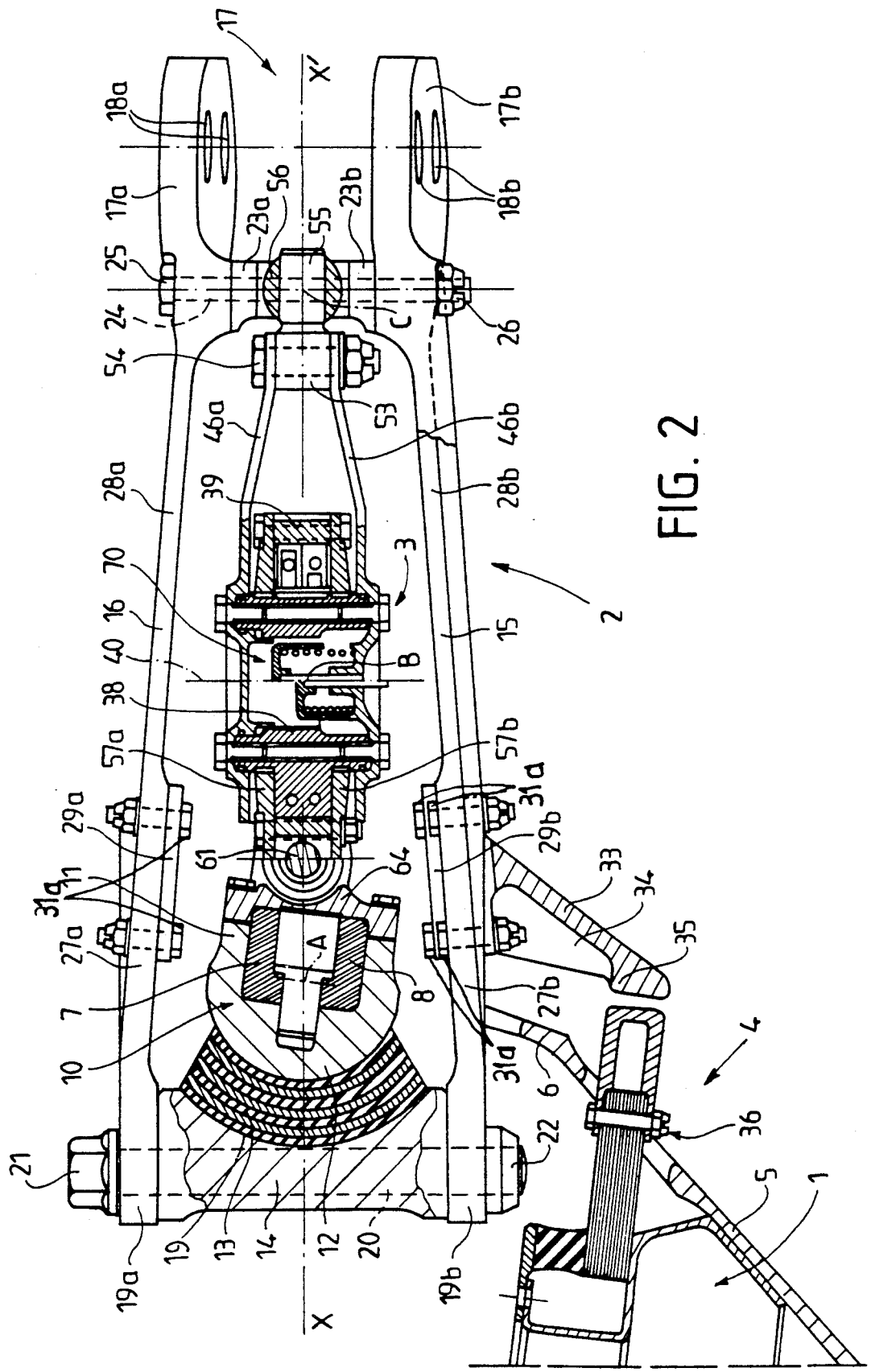
FIG. 2 is a view along the line II—II of FIG. 1.

Referring to FIGS. 1 and 2, it can be seen that a rotor head according to a first embodiment of the invention essentially comprises a hub 1 constituted by the upper section of an integrated tubular mast-hub such as described in U.S. Pat. No. 4,732,540 by the applicant. Onto this device are articulated in flapping, pitch and a drag, attachment pieces 2 for attachment to the blades (which are not shown). Each attachment piece 2 is associated with a damping device 3 which is functionally mounted between hub 1 and attachment piece 2 and intended to dampen the drag movements of the attachment piece 2 and of the blade with which it is associated.

The mast section (not shown) of hub 1 is coaxially prolonged by a tubular hub body 4 which flares out from the mast, on the one hand, by a first truncated-cone section 5 and, on the other hand, by a second truncated-cone section 6 extending the first section 5 from its most flared out periphery, with a smaller angle of conicity. This second truncated-cone section 6 carries a belt 7 which surrounds it in an annular manner at its extreme periphery. The median plane of said belt 7 is substantially perpendicular to the axis of the rotor and of hub 1. The contour delimited in the plane by belt 7 is a pseudo-regular polygon having rounded points and equal and rectilinear small sides 8 alternating with equal and rectilinear large sides 9, the number of small sides 8 being equal to the number of large side 9 and to the number of blades of the rotor. The small and large sides 8 and 9 have a same U-shaped cross-section whose base is on the side of the axis of the rotor and whose arms extend towards the outside of the rotor, each of the sides 8 or 9 being tangential at its base in its central section to the upper truncated-cone section 6.

On each of the small sides 8 of the belt 7 is fitted a stirrup 10 having a U-shaped cross-section delimited by two arms 11 and a base 12 substantially and respectively corresponding to the shape of the outer surfaces of the arms and of the base of the small side 8 of the belt 7 with which it is associated. The stirrup is held on the small side 8 by a screw 10a whose head bears on the outer radial face of the base of the small side, and whose threaded shank traverses the base of the small side 8 in order to fit into a complementary threaded bore provided in the base 12. The inner radial surface of base 12 is a portion of a sphere whose virtual center is located on the median section of small side 8, at equal distance from the large sides 9 which prolong small side 8 and substantially in the center of its thickness. Stirrup 10 constitutes the outer radial brace of a laminated spherical thrust bearing 13, which serves, in a conventional manner, as a flapping, pitch and drag articulation as well as a means of withstanding centrifugal forces for the attachment piece 2 and the blade with which it is associated. This laminated spherical thrust bearing 13 essentially comprises a central laminated section consisting in a stack of layers in the shape of spherical caps which are alternately rigid, for example made of metal, and made of an elastic material such as a synthetic rubber, for example a silicone elastomer. This central laminated section is vulcanized between two rigid braces, made of metal, one of which is the base 12 and the other of which an inner brace 14, which is integral with the attachment piece 2.

Attachment piece 2 is essentially constituted by two rigid plates 15 and 16, substantially identical and disposed symmetrically opposite each other with respect to the plane of the blade with which it is associated, and with respect to the axis of the latter, the plates 15 and 16 extending along the axis. These two plates 15 and 16 together define, at their end which is most distant from the axis of the rotor, a fork 17 intended to receive the foot of the blade. This blade foot is held between the two arms 17a and 17b of this fork 17 by two pins (not shown) perpendicularly traversing the blade as well as arms 17a and 17b at the level of holes 18a and 18b produced in order to receive them. These two plates 15 and 16 extend from the arms 17a and 17b defining fork 17 substantially becoming more distant from each other up to the inner brace 14 of the laminated spherical thrust bearing 13 which serves as cross-piece at their end opposite to that of the foot of the blade. Each of these two plates 15 and 16 has a substantially elongated isosceles trapezoidal shape whose large base is at the level of the free end of the fork 17, its small base being disposed at the other end of said attachment piece 2, substantially at the level of the inner brace 14. The latter is disposed inside the body of the hub 4, and the lower plate 15 traverses tubular body 4 at the level of an opening produced for this purpose in the upper truncated cone section 6.

The inner brace 14 itself has a shape delimited by two identical faces in contact with the plates 15 and 16 which are substantially isosceles trapezoids connected to each other by generatrices which are perpendicular to the median planes of said plates 15 and 16. The small base of the faces coincide with the small base of the plates 15 and 16. On the surface of the brace 14, which faces the fork 17 on the inside of said piece 2, is provided a hollowing 19 in the shape of a spherical cap which receives the central section of the laminated spherical thrust bearing 13. The plates 15 and 16 are terminated at the level of their surface in contact with inner brace 14 by lugs, respectively referenced 19b and 19a, which have slight additional thickness towards the inside of said piece 2 with respect to the sections 27a and 27b of the plates 15 and 16 which they prolong. These lugs 19a and 19b are integral with the inner brace 14 by the intermediary of two bolts 20 which traverse inner brace 14 and lugs 19a and 19b in a direction perpendicular to the drag plane of the corresponding blade. The head 21 of a bolt 20 bears on the outer surface of the plate 16, the threaded end of the shank of said bolt 20 protruding under the plate 15 and being associated with a nut 22 whose thread works in conjunction with the thread of the shaft in order to maintain the nut bearing on the outer surface of plate 15.

The two plates 15 and 16 are also held with respect to each other substantially at the level of the base 23 of the fork 17 which forms a cross-piece between said plates. This base 23 is constituted by two shoulders 23a and 23b each extending substantially perpendicular to the plate 16 or 15 with which it is respectively associated, toward the inside of the attachment piece 2. These two shoulders 23a and 23b are held against each other by the intermediary of two bolts 24 distributed along a width of the plates 15 and 16 and traversing plates 15 and 16 and shoulders 23a and 23b. The head 25 of bolt 24 bears on the upper surface of the plate 16, in a housing in the latter provided for this purpose. The threaded end of the shank of bolt 24, opposite head 25, is associated with a nut 26 which is held, in conjunction of its thread with the thread of said shank, in bearing on the lower and outer surface of the plate 15. These shoulders 23a and 23b are each carried by a section 28a and 28b of the plates 15 and 16 prolonged by the sections 27a and 27b which carry lugs 19a and 19b which each have an excess thickness towards the inside of the piece 2 with respect to sections 28a and 28b.

On each of the sections 27a and 27b is mounted a transverse arm 29a and 29b, these two arms bearing the pitch control lever 30 of attachment piece 2 and of the blade associated therewith. These two arms 29a and 29b are held in bearing on the inner surfaces of the sections 27a or 27b, between the heads of four bolts 31a and the nuts associated with them; the bolts traversing arms 29a and 29b and sections 27a and 27b. Arms 29a and 29b each have an edge substantially extending along the line of transition between the sections 27a or 27b and the sections 28a or 28b and have a width substantially corresponding to a half-width of the sections 27a or 27b. These arms 29a and 29b together define a half-sleeve in one piece with the pitch control lever 30 which laterally protrudes from one side of the connection piece 2, slightly inclined towards the hub body 1. This pitch control lever 30 terminates with a fork 31 for a ball articulation on the upper end of pitch rod 32 connected to a swash plate device (not shown). The center of the fork 31 is substantially located in the median plane of the annular belt 7 of the hub body 4.

The lower plate 15 of the connection piece 2 is also integral, at the level of its section 27b, with a lower flapping stop-piece 33 protruding under the lower surface of plate 15, this lower stop-piece 33 having a substantially right-angled triangle cross-section and being rigidified by a rib 34 extending from its base at the level of the plate 15 to its opposite end, the whole being in one piece with said plate 15 or fixed to plate 15 by the intermediary of the bolts 31a holding the arm 29 on the plate. At its lower end, the lower flapping stop-piece 33 is terminated by a shoulder 35 having excess thickness and intended to work in conjunction with a corresponding ring 36 of a known structure which is fitted around the hub 1 so as to limit the flapping of the blades in a downward direction. This structure has been described in U.S. Pat. No. 5,007,799, by the applicant.

The damping device 3 associated with the attachment piece 2 is of the rotary type with hydro-elastic damping. It essentially comprises two units 38 and 39 capable of pivoting with respect to each other about a common pivoting axis and whose relative movements are hydro-elastically damped. One of the units, hereinafter referred to as the rotor unit 38, is mounted inside the other of the units, which is hereinafter referred to as the stator unit 39.

Referring to FIGS. 1 to 4, it can be seen that the rotor unit 38 has a cylindrical main outer shape with a circular cross-section. It is mounted in a hollowing or space in the stator unit 39 delimited by a wall whose inside surface also has a principal shape of a cylinder with a circular cross-section. Units 38 and 39 are coaxial, with their common axis 40 being their relative pivoting axis. The cylindrical envelope 37 of the stator unit 39 thus defined has a height which substantially corresponds to a half-height of the rotor unit 38, the median planes of the stator unit 39 and of the rotor unit 38 being substantially merged. This envelope 37 is provided with vanes 41 regularly distributed around the perimeter thereof, and radially extending to the immediate proximity of the outer cylindrical surface of the rotor unit 38 over a height which corresponds to the height of the envelope 37. Vanes 41 have a cross-section in the abovementioned median plane which is substantially of an isosceles trapezoidal shape, whose large base is at the level of the cylindrical wall 37.

The rotor unit 38 is also provided with vanes 42 regularly distributed around its perimeter, vanes 42 extended radially from the outer surface of the rotor unit 38 to the immediate proximity of the cylindrical envelope 3 of the stator unit 39 opposite which they are very precisely disposed, with their height corresponding to that of envelope 37. The number of vanes 42 is equal to the number of vanes 41, a vane 42 being included between two vanes 41 and vice-versa. Each vane 42 is constituted by two fins 43, which are parallel and side by side. Each fin 43 is traversed by two circular orifices 44 having the same radius and disposed one above the other along one of its heights; the orifices 44 of the two fins 43 of a same vane 42 being opposite each other. Two orifices 44 facing each other and belonging to a same vane 42 are associated with a common folded-back metal leaf 45. This metal leaf extends radially over the inside surface of the V-shaped hollowing delimited by the two fins 43 which carry these orifices 44, from the end of one of these two fins 43, overlapping in particular the orifices 44 traversing the fin 43, up to the end of the hollowing, then from the base along the other fin 43 up to the edge of the other orifice 44. Orifice 44 is not covered thereby. Each vane 42 is thus associated with two arms of a leaf 45. For a same fin 43, one of the orifices 44 is associated with one arm of the leaf 45 which is superimposed on it and which closes it in the rest position, while the other of the orifices 44 is in no way covered. In this way, on a same vane 42, each orifice 44 which is not covered by an arm of the leaf 45 is facing that one of the orifices 44 of the fin 43 which is opposite to it, which is closed by an arm of the metal leaf 45, and vice-versa. These arms of the metal leaves 45 serve as valves for the hydro-elastic damping device.

The rotor unit 38 is mounted between two arms 46a and 46b of a fork 46. The rotor unit is traversed in its interior by a hollowing 47, the shape of which is principally cylindrical, and which is centered on said axis 40. An annular impression 48a or 48b is provided on each of these two arms 46a and 46b in order to receive the cylindrical wall of the rotor unit 38 at each of its ends. This cylindrical wall of rotor unit 38 is furthermore transversed through its entire height by threaded bores 49 intended to receive at each of their ends screws 50 holding the arms 46a and 46b onto the rotor unit 38 by the working in conjunction of their thread with the inside threads of bores 49, their heads bearing on the annular plates which are the outer surfaces of the bases of the annular impressions 48a and 48b.

These two arms 46a and 46b substantially extend, at the level of the rotor unit 38, each with a median plane perpendicular to the pivoting axis 40, along a semi-circular contour 51 centered on axis 40 and whose principal diameter corresponds to a diameter of the envelope 37, contour 51 being prolonged by a section 52 substantially having an isosceles trapezoidal delimitation whose large base is constituted by the above-mentioned diameter. Trapezoidal sections 52 are braced with respect to each other towards their end which is opposite to the rotor unit 38, at the level of their small base, by the intermediary of a cross-piece 53 which is substantially parallelepipedal. The height of cross-piece 53 substantially corresponds to that of the envelope 37, of which a length corresponds substantially to the small base and of which the lateral widths at the level of the sides of the arms 46a and 46b are substantially rounded. The sides of cross-piece 53 thus have the shape of an arc of a cylinder extending between arms 46a and 46b. These trapezoidal sections 52 extend from cross-piece 53 by becoming more distant from each other up to the level of the stator unit 39 where they are prolonged in the abovementioned median planes. They are solidly jointed to cross-piece 53 by two bolts 54 which traverse it and which are distributed in the length of cross-piece 53. The heads of the bolts bear on the outer surface of the upper arm 46a, and the free ends of bolts 54 are threaded and work in conjunction with a nut which bears on the outer surface of the lower arm 46b. This cross-piece 53 is extended, from its face which is the most distant from the rotor and stator units 38 and 39, by a cylindrical rod 55 of small diameter which is perpendicular to the face and which is centered on one of the diameters of said rotor unit 38 merged with the pitch-changing longitudinal axis of the blade in the neutral position of the blade. This rod 55 is fitted into a complementary bore which traverses a spherical ball 56 mounted in free rotation about its center between two complementary caps at the level of which are provided on their facing surfaces. The shoulders 23a and 23b together form the base of the fork 17. Rod 55 is capable of sliding axially with respect to the complementary bore which receives it in the ball 56.

The principal cylindrical envelope 37 of the stator unit 39 is mounted between two annular rings 57a and 57b, which are coaxial with unit 39, and substantially flat. The opposing faces of rings 57a and 57b are perpendicular to the axis 40. Their outer surface has a slightly truncated-cone shape flaring from their outer annular edge to their inner annular edge, which is located at the level of the outer wall of the rotor unit 38. These rings 57a and 57b are integral with the walls of said cylindrical envelope 37 by bolts 58 which traverse them in their height. The heads of bolts 58 bear on the outside surface of the upper ring 57a. The shank of bolt 58 emerging from the lower ring 57b by a threaded section working in conjunction with a nut 59 which bears on the outside surface of ring 57b. The wall of cylindrical envelope 37 is provided with as many bores 58a for receiving these bolts 58 as there are vanes 41, the axis of each bore 58a being disposed in the radial prolongation of such a vane 41. In order to facilitate the mounting of bolts 58 and the nuts associated with them, circular orifices 59a are provided which traverse the arms 46a and 46b symmetrically with respect to their axis of symmetry. The orifices have a diameter which is sufficient to allow the passage of the heads of bolts 58, the nuts 59 and tightening tools such as spanners.

The wall of the cylindrical envelope 37 is extended, in its section closest to the hub 1 and the belt 7, by two lugs 60a and 60b whose thickness corresponds to the height of the envelope 37. The lugs are symmetrically distributed with respect to a plane passing through the axis 40 and the axis of the rotor, and extend from envelope 37 substantially up to the belt 7. These lugs each face the intersection between the small side 8 carrying the corresponding attachment piece 2 and one of the large sides 9 which surround it respectively. Each of the two lugs 60a and 60b is traversed by a bore, the two bores associated with these two lugs 60a and 60b being coaxial and of the same diameter. Their common axis is parallel to the small side 8. Lugs 60a and 60b both receive a same shaft 61, swivelling between two end bearings 62a and 62b, respectively fitted into the bores. Shaft 61 protrudes with respect to each of the two lugs 60a and 60b and is mounted by its protruding sections between two lugs 63a and 63b of a connecting piece 64, the two lugs 60a and 60b being mounted between these two lugs 63a and 63b which each extend laterally with respect to one of the lugs 60a and 60b respectively, parallel to the latter. Connecting piece 64 extends along the small side 8 by being extended beyond the lugs 63a and 63b over a section of the large sides 9 which surround it in order to bear thereupon. More precisely, connecting piece 64 forms a cover, at the level of the small side 8, for the belt 7 having a U-shaped cross-section and is integrally connected there by screwing on the arms of the stirrup 10. The sections of the piece 64 which is substantially at the level of the large sides 9 beyond the lugs 63a and 63b bear two forks 65a and 65b, each integral with a support-lug protruding with respect to the ends of the arms of the belt 7.

Each of the lugs 63a and 63b is traversed by a bearing 66a or 66b receiving the shaft 61 of which one end is provided with a head 67a which bears on the outer surface of the lug 63a and its other end is threaded, its thread working in conjunction with the complementary thread of a nut 67b which bears on the outer surface of the lug 63b.

Figure 3:
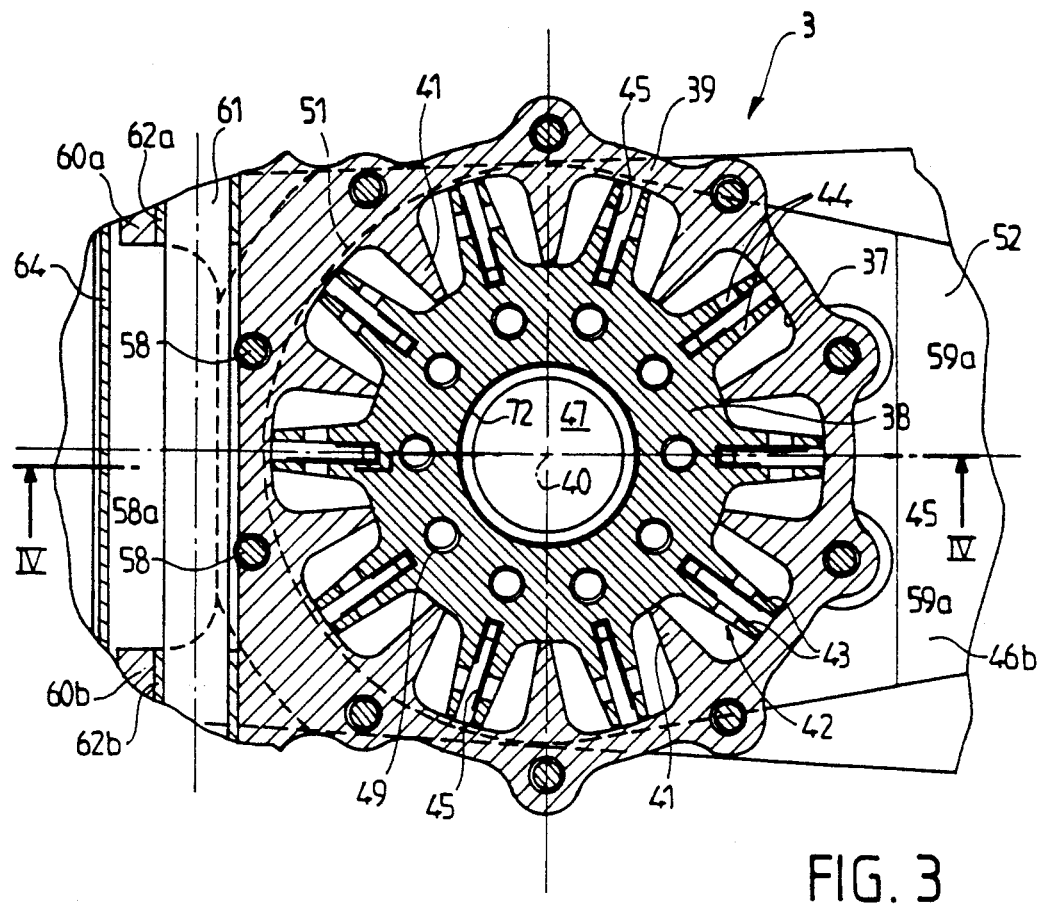
FIG. 3 is a cross-sectional view along the plane of FIG. 1, with cut-aways, of the damping device associated with the attachment piece shown in FIG. 1.
Figure 4:
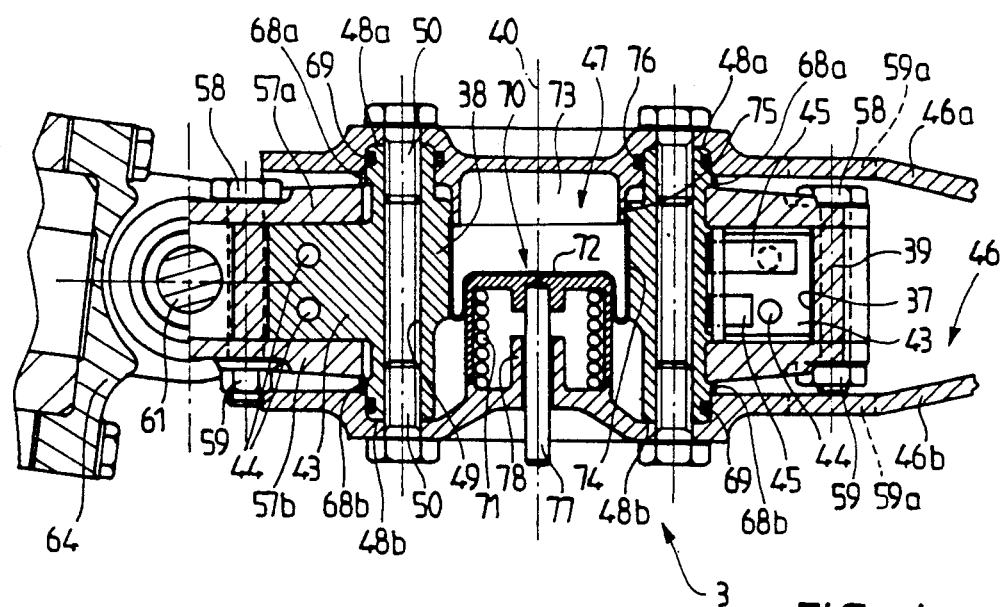
FIG. 4 is a cross-sectional view along line IV—IV of FIG. 3.

Referring more particularly to FIGS. 3 and 4, it will be noted that the chambers delimited between the rotor and stator units 38 and 39 are filled with a high viscosity fluid intended to dampen the relative movements of the units. The fluid is contained inside the volumes delimited by the vanes 41, the vanes 42, the principal cylindrical wall of the unit 38 and the envelope 37, the annular rings 57a and 57b, and by elastic membranes 68a and 68b. These elastic membranes connect the surfaces of the rings facing the arms 46a and 46b of the fork 46 to the rotor unit 38, at the level of the annular impressions 48a and 48b. The annular impressions 48a and 48b and the rotor unit 38 are associated with static O-ring seals 69 mounted between the outer surface of rotor unit 38 and the annular walls of larger diameter of impressions 48a and 48b. The rotor unit 38 is traversed in its tubular thickness by bores (not shown) radially disposed at the level of the rings 57a and 57b. These bores bring into communication the volumes defined above and the hollowing 47, into which they open at the level its upper section whose diameter is slightly greater than the diameter of the principal and median section 74 of the hollowing. The wall of the unit 38 which delimits the upper section is located opposite a centering skirt 75 which extends inside the upper arm 46a up to the median section 74, the outer walls of skirt 75 working in conjunction with inner walls of said section 74.

The hollowing 47 is associated with a piston 70 comprising a base, which is a disk of diameter less than the diameter of the section 74, surrounded by a cylindrical wall extending from said base towards the lower arm 46b. The piston 70 is centered on axis 40 and is mounted on a coil spring 71 disposed in its interior. Spring 71 is held in compression between the arm 46b and the base of said piston 70. This piston 70 carries an unrolling membrane 72 whose edge is fitted to a periphery of the principal cylindrical section 74 at the level of the centering skirt 75. Unrolling membrane 72 thus delimits in the upper section of the hollowing 47 a chamber 73 receiving the fluid of the working chambers and serving as chamber for compensating for the expansions of the fluid. An O-ring 76 is mounted between the inside walls of the rotor unit 38 and the annular wall of smaller diameter of the upper impression 48a, to ensure the fluid-tightness between these two parts, and to prevent any possible leakage through the bores receiving the screws 50. This piston 70 is furthermore associated with a centering pin 77 which is integral with its base and which extends axially from the base up to the arm 46b which it traverses at the level of a cylindrical holding sleeve 78 which is coaxial with it and which extends from the arm 46b towards the base of the piston 70.

Figure 5:
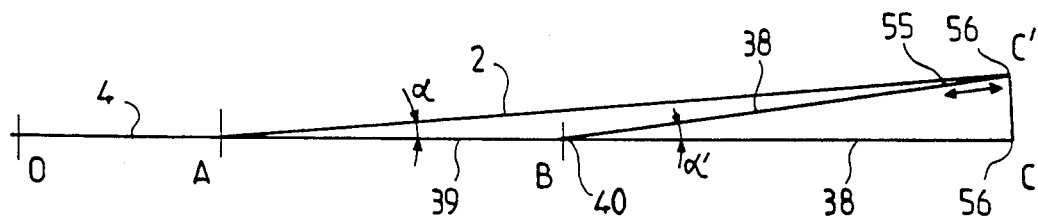
FIG. 5 is a diagrammatic illustration of the damping kinematics of the drag movements of the attachment piece in FIGS. 1 to 4, in a plane rotating with the rotor of the rotary wing aircraft.

In operation, such a damping device operates in the manner which will now be described. In its drag movements, the blade and the attachment piece 2, associated with said damper 3, pivot about the center A of the laminated spherical thrust bearing 13. Point A is fixed with respect to the hub body 4. Referring to FIG. 5, it can be seen that when said attachment piece 2 rotates about the point A by an angle $\alpha$, the center of the ball 56, which is fixed with respect to said piece 2, passes from a point C to a point C' by simple rotation about said center A. The stator unit 39 is integrally held in the drag plane of the belt 7 of the hub body 4 through the pivot joint formed by the shaft 61. The axis of relative pivoting 40 of the rotor and stator units 38 and 39 therefore remains fixed with respect to said hub body 5 and is held at a fixed point B in said drag plane. The rotor unit 38 which is articulated, on the one hand, at one of its ends in a pivoting manner about the ball 56, and, on the other hand, in a pivoting manner about axis 40, therefore necessarily pivots by an angle $\alpha'$ about said point B in order to accompany the pivoting of the ball 56 about the point A. The rod 55 substantially slides, as indicated by the double arrow shown in FIG. 5, in the complementary hollowing in the ball 56 in which it is mounted. The rod therefore accompanies the slight modification in distance between the axis 40 and the center of the ball 56 and makes the pivoting by an angle $\alpha'$ of the rotor unit 38 about the axis 40 compatible with the pivoting by an angle $\alpha$ of its point of articulation on the ball 56, about the point A, with the blade and the attachment piece 2.

It is by this angle $\alpha'$ through which the rotor and stator units 38 and 39 pivot relatively and therefore by which the damping device 3 is operated by the intermediary of the relative movement of the vanes 41 and the vanes 42. During this relative pivoting of the rotor and stator units 38 and 39, the high viscosity fluid transfers from one to the other of the two volumes delimited between two successive vanes 41 by a vane 42 passing, on the one hand, between the ends of the fins 43 at which are facing the envelope 37 and said envelope 37 and, on the other hand, through the throttling orifices 44. The fluid throttling thus obtained braking the relative movement of the rotor and stator units 38 and 39 and therefore the blade drag movement which corresponds to this relative movement. During small drag movements, corresponding relative movement of the rotor and stator units 38 and 39 are not very large and therefore have small differential pressures between the two volumes defined above between two vanes 41. The valves 45 therefore remain in the closed position on the orifices 44 with which they are associated. The laminar flow of the fluid through the vanes 42 is therefore carried out by the passing of the fluid through the two orifices 44 of a same vane 42 which are not closed by a valve 45 and which are offset in the height of said vane 42 with respect to each other. The damping thus produced for small drag movements is a high gradient damping. For larger drag movements of the blade, the valves or spring leaves 45 open under the action of the fluid which passes from one to the other of the two abovementioned volumes delimited between two successive vanes 41 principally through two laminar flow orifices 44 facing each other on a same vane 42. The damping gradient is therefore lower.

It will also be noted that such a damping device 33 allows the obtaining of a relative damping by an angle $\alpha'$ greater than the angle $\alpha$ through which the blade pivots in drag, this becoming greater as the pivoting axis 40 becomes more distant radially towards the exterior from the drag center A and closer to the ball 56.

Furthermore, this damping structure has the advantage of avoiding any coupling between the pitch, drag and flapping movements. The pitch orientation of the blade in fact corresponds to a pivoting movement of the blade and of its attachment piece 2 about the axis X—X' shown in FIG. 2. Axis X—X' passes, whatever the position of said blade may be, both through the center A of the laminated spherical thrust bearing and through the center of the ball 56. Consequently, it can be seen that a change in pitch orientation does not modify the relative positions of the rotor and stator units 38 and 39 in any way. There is therefore no coupling between the pitch movements and the drag movements.

Figure 6:
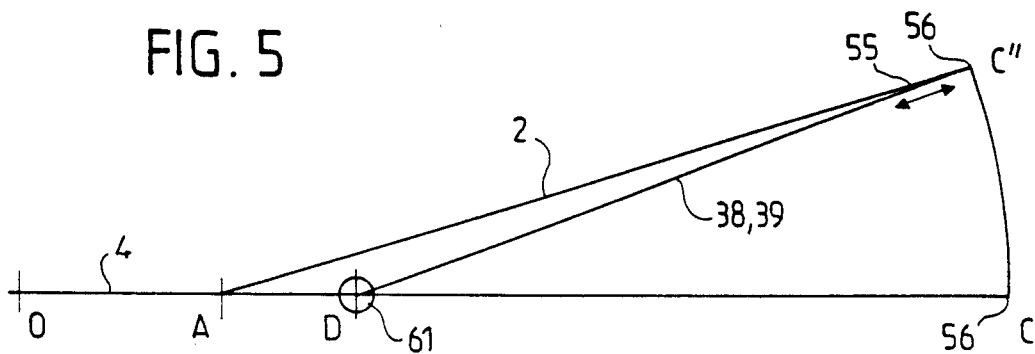
FIG. 6 is a diagrammatic illustration, in a plane rotating with the rotor of the rotary wing aircraft about the axis of the rotor and passing through the axis, of the kinematics of the flapping movements of the attachment piece.

With regard to the lapping movements, it can be seen, by referring to FIG. 6, that during such a movement the attachment piece 2 pivots with the blade about the center of the laminated spherical thrust bearing A, thus driving, in its pivoting, the ball 56, whose center passes from C to C" in a flapping plane rotating with the hub body 4 about the axis of the rotor. The rotor and stator units 38 and 39 are thus caused to pivot together about the axis of the shaft 61 (point D in the pivoting plane) in order to accompany the pivoting of the ball 56, the rod 55 sliding as indicated by the double arrow in the figure substantially in the complementary hollowing in which it is mounted in the ball 56. Here again, it can be seen that the relative positions of the rotor and stator units 38 and 39 are not changed by such a flapping movement; the flapping movements and the drag damping are independent.

Another possible variant of the invention is shown in FIGS. 7 to 12. The elements of the rotor head which have been previously described have been used again and are found in this new variant with the reference numbering increased by 100.

The rotor head according to this variant comprises a hub 101 with an integrated tubular mast onto which are articulated by the intermediary of attachment pieces 102, in flapping and in drag, blades (not shown) each of which is associated with a rotary-type device 103 for the damping of its drag movements.

The tubular body of the hub 104 flares out from the mast section (not shown) by two tubular truncated-cone sections 105 and 106 which extend it. The upper truncated-cone section 106 is less flared then the truncated-cone section 105. The section 106 is associated with a reinforcing belt 107, having U-shaped cross-section turned towards the outside of said tubular body 104. This belt 107 extends around a contour substantially having the shape of a pseudo-regular polygon, having equal small sides 108 alternating with equal large sides 109. On each small side 108, is embedded a stirrup 110 whose base 112 constitutes an outer brace carrying a laminated spherical thrust bearing 113. The inner brace 114 of this thrust bearing 113 is integral with the attachment piece 102. This inner brace 114 is fixed by bolts 121 and nuts 122 as a cross-piece between the ends of upper 200a and lower 200b arms forming a radial fork prolonging towards the inside of the rotor a central sleeve 201 of the attachment piece 102. At its other end, attachment piece 102 is also shaped as a fork 117 between the two arms 117a and 117b of which the foot of the corresponding blade is retained by the intermediary of two pins 202 passed through orifices provided for this purpose in the foot and in arms 117a and 117b. One of these pins 202 is provided at its upper section with a ring 203 allowing its manual removal after the withdrawal of a retaining pin 204 locking it at its lower section. This allows, after removal of this pin 202, the blade to be pivoted about the other of the two pins 202 so as to fold up the blade when the rotary wing aircraft is in the rest condition.

The central sleeve 201 laterally carries the pitch control lever 130, the center of whose end fork 131 remains in the vicinity of the flapping axis of the corresponding blade. This sleeve 201 also carries, in its lower section, a low flapping stop-piece 133 terminated at its lower end by a removable wear pad 205 intended to work in conjunction with a corresponding ring 136 which is mounted, in a way which is known per se, around the hub 101 so as to limit the flapping of the blade in a downward direction.

The arms 117a and 117b of the fork 117 are extended up to the central sleeve 201 as two longitudinal plates 206a and 206b, which are substantially flat and have an excess thickness towards the inside of the articulating part 102 with respect to their section at the level of sleeve 201. Each of these plates 206a and 206b is traversed in its thickness by bores 207a and 207b whose centers are respectively regularly distributed on a circle in the plane of the plate 206a or 206b which they traverse. The center of the circle is disposed on the median length of said plate 206a, 206b and the radius of the circle is substantially less than a half-width of said plate. These bores 207a and 207b are provided to receive fixing bolts 208 engaged in complementary bores traversing through their height of the walls of the rotor unit 138 having a cylindrical main body and fitted between plates 206a and 206b. The height of rotor unit 138 substantially corresponds to that which separates plates 206a and 206b. The main body of rotor unit 138 is associated with vanes 142 regularly distributed on its median contour. Rotor unit 138 is mounted inside the envelope 137 delimited by the inner walls of a stator unit 139. This envelope 137 also has a principal shape which is substantially cylindrical and coaxial with the rotor unit 138 and of height slightly greater than the height of the vanes 142 and less than that of said unit 138. The rotor and stator units 138 and 139 have a same median plane. Stator unit 139 is also interiorly provided with vanes 141 regularly distributed over its inside surface in such a way that a vane 141 alternates with a vane 142. The vanes 142 extend from the cylindrical surface of the rotor unit 138 up to the inner cylindrical surface of the stator unit 139; the vanes 141 extend from the surface of the envelope 137 up to the rotor unit 138.

The stator unit 139 and the rotor unit 138 are capable of pivoting with respect to each other about a relative pivoting axis 140 which is their axis of revolution. On the stator unit 139 there is furthermore articulated a stirrup 209 in a pivoting manner about an axis 211 in a median plane of stator unit 139 and substantially perpendicular to the axis of the blade. Axis 211 passes through the axis 140. Stirrup 209 has arms 210 which are disposed substantially in a semicircular arc whose principal diameter is on pivoting axis 211 and which has a substantially I-shaped cross section. The stirrup 209 is radially prolonged in its section most distant from its pivoting axis 211 and from the ends of the branches 210 by a cylindrical rod 212. This rod 212 is fitted into a complementary hollowing or space provided in a ball 213 capable of pivoting about its center, which itself is fixed with respect to the hub body 101. Ball 213 is mounted in a complementary hollowing 214 provided in a cover 215 integral with to the stirrup 110 by screwing on the arms 111. The rod 212 is capable of sliding in its complimentary housing in the ball 213.

The stator unit 139 comprises on either side of the ends of the arms 210, with respect to the axis of the blade, two cheeks 216 and 217 extending laterally in the prolongation of the walls of stator unit 139 which are opposite to stirrup 209. These cheeks 216 and 217 form with the walls of the stator unit 139 which are at the level of the axis 21;, between the arms 210, two lateral forks receiving the ends of arms 210. The two cheeks 216 and 217, as well as the walls of stator unit 139 which face each other, are provided with bores allowing the association of each of the forks thus defined with a screw 218 or 219; this screw forms the relative pivoting axis of the stirrup 209 on the stator unit 139. The head of screw 218 or 219 bears on the outside surface of the corresponding cheek 216 or 217. The end opposite to the head being threaded and fitted inside a complementary threaded bore radially provided in the stator unit 139 at the level of one of its vanes 141. The two diametrically opposite vanes 141 associated with such a bore have a thickness which is greater than that of the other vanes 141. The body of screw 218 or 219 carries a ball 220 or 221 received in a ball socket mounted in a complementary bore provided in the end of the arm 210 with which it is associated.

Figure 10:
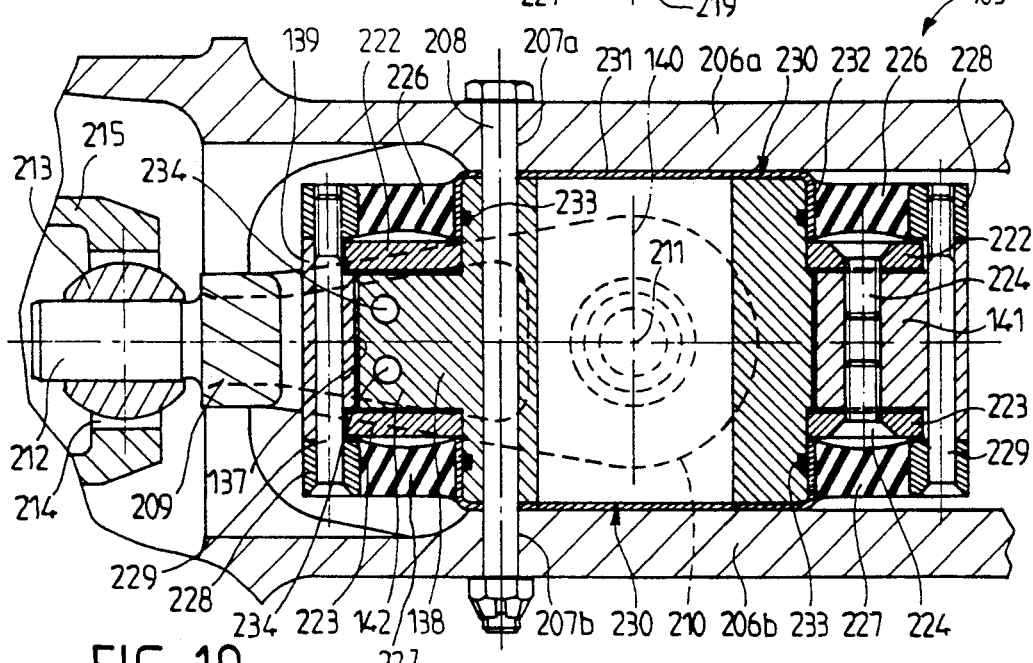
FIG. 10 is a view along the line X—X of FIG. 9.

As can be seen in FIG. 10, the rotor and stator units 138 and 139 are associated with two flat annular rings 222 and 223 between which their vanes 141 and 142 are mounted. These two rings 222 and 223, centered on the relative pivoting axis 140 of the units, are identical to each other and have an inside diameter which corresponds to the outside diameter of the rotor unit 138, while their outside diameter corresponds to the diameter of the envelope 137. These two rings 222 and 223 are separated from each other by a distance which corresponds to the height of the vanes 141 and 142 and are integral with the vanes 141 of the stator unit 139 by their intermediary of screws 224. Screw 224 threads into the threaded bores traversing each of the vanes 141 and their height. The heads of the screws 224 bears on the face of the ring 222 or 223 with which they are associated, which is the most distant from the vane 141. Each ring 222 or 223 is also associated with an annular elastic membrane 226 or 227, respectively, which is superimposed on its surface opposite to the vanes 141 and whose inside and outside diameters are slightly less than those of rings 222 and 223. The outer annular wall of each of these two membranes 226 or 227 is integral in a fluid-tight manner by vulcanization with a ring 228 which surrounds them with a same thickness. The walls of the envelope 137 thus are mounted between two rings 228 which are superimposed on them and which surround them with a same annular profile. Each ring 228 is integral with the walls of the envelope 137 by the intermediary of screws 229 whose threads work in conjunction with complementary threads provided in bores traversing said cylindrical walls of the envelope 137 throughout their height. The head of such a screw 229 bears on the ring 228 which is superimposed on the lower surface of the walls of the envelope 137. The length of the body of screws 229 is greater than the height of envelope 137. The upper section of the body emerges, after having traversed the walls of envelope 137, in a complementary bore provided in the upper ring 228 comprising a thread working in conjunction with the thread at the end of the abovementioned screw 229. Each annular elastic membrane 226 or 227 is also connected, by its inside annular wall, to the edge of a cover 230 respectively fitted to the upper and lower sections of the rotor unit 138. Cover 230 is constituted by a base 231 having the shape of disk of the same diameter as the main body of the rotor unit 138, over which it is coaxially disposed. Base 231 is surrounded at its periphery by a cylindrical edge 232 which bears on its outer surface the inside wall of the membrane 226 or 227 with which it is integral in a fluid-tight manner by vulcanization, and which extends from the base to the ring 222 or 223 which is associated with the annular membrane.

Between the outer cylindrical wall of one end of the rotor unit 138 and the inner wall of the edge 232 fitted to the wall is fitted an annular seal 233, ensuring the fluid-tightness between the two parts. The volumes delimited by the cylindrical envelope 137 of the stator unit 139, the outer cylindrical walls of the rotor unit 138, the vanes 141 and 142, the rings 222 and 223, the elastic annular membranes 226 and 227, are filled with a high viscosity fluid. This fluid circulates during a relative movement between the rotor and stator units 138 and 139 through pairs of orifices 234 provided in the vanes 142. Each vane 142 is traversed in its thickness by two such cylindrical orifices 234 distributed one above the other in its median height. Each orifice 234 is associated at each of its ends with a spring leaf 235, which extends in front of the orifice along the vane 142 through which the latter traverses and is integral with the vane by screwing towards the main cylindrical section of the rotor unit 138. The two leaves 235 thus associated with a same vane 141 are distributed on either side of the latter, at two height levels. The fluid also flows over the sides of vanes 141 between the ends of the vanes and the envelope 137, between the upper and lower surfaces of the vanes 141 and the rings 222 and 223, between the edges of rings 222 and 223 and the envelope 137, and between the elastic annular membranes 226 and 227 and the faces of the rings 222 and 223 opposite Which they are disposed. These elastic membranes 226 and 227 allow, by deforming, the absorption of the possible expansions of the hydraulic fluid, including thermal expansions. Stressed in shear during rotary pivoting of the two units 138 and 139, they also allow the elastic return of units 138 and 139 as has been more particularly described in the U.S. Pat. No. 4,768,630 by the applicant, relating to damping devices of the type of that of the rotor head structure described here. The function of the damping device 103 are substantially identical to that of the devices of this patent.

Figure 11:
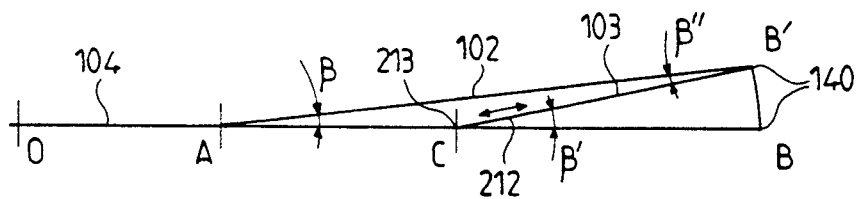
FIG. 11 is a diagrammatic illustration of the damping kinematics of the drag movements of the attachment piece in FIGS. 7 to 10 in a plane rotating with the rotor of the rotary wing aircraft about its axis.
Figure 12:
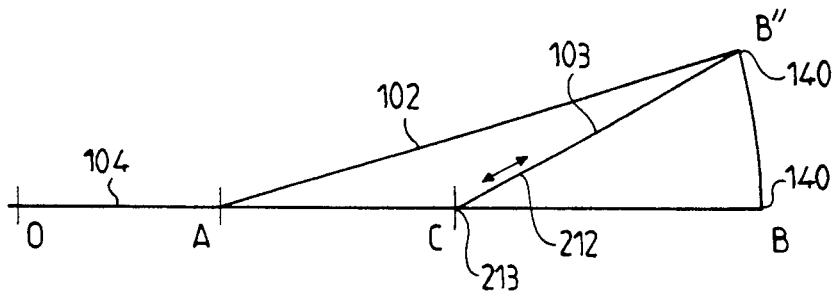
FIG. 12 is a diagrammatic illustration of the kinematics of the flapping movements of the same attachment piece, in a plane rotating with the rotor of the rotary wing aircraft about the axis of the rotor and passing through the axis.
Figure 7:
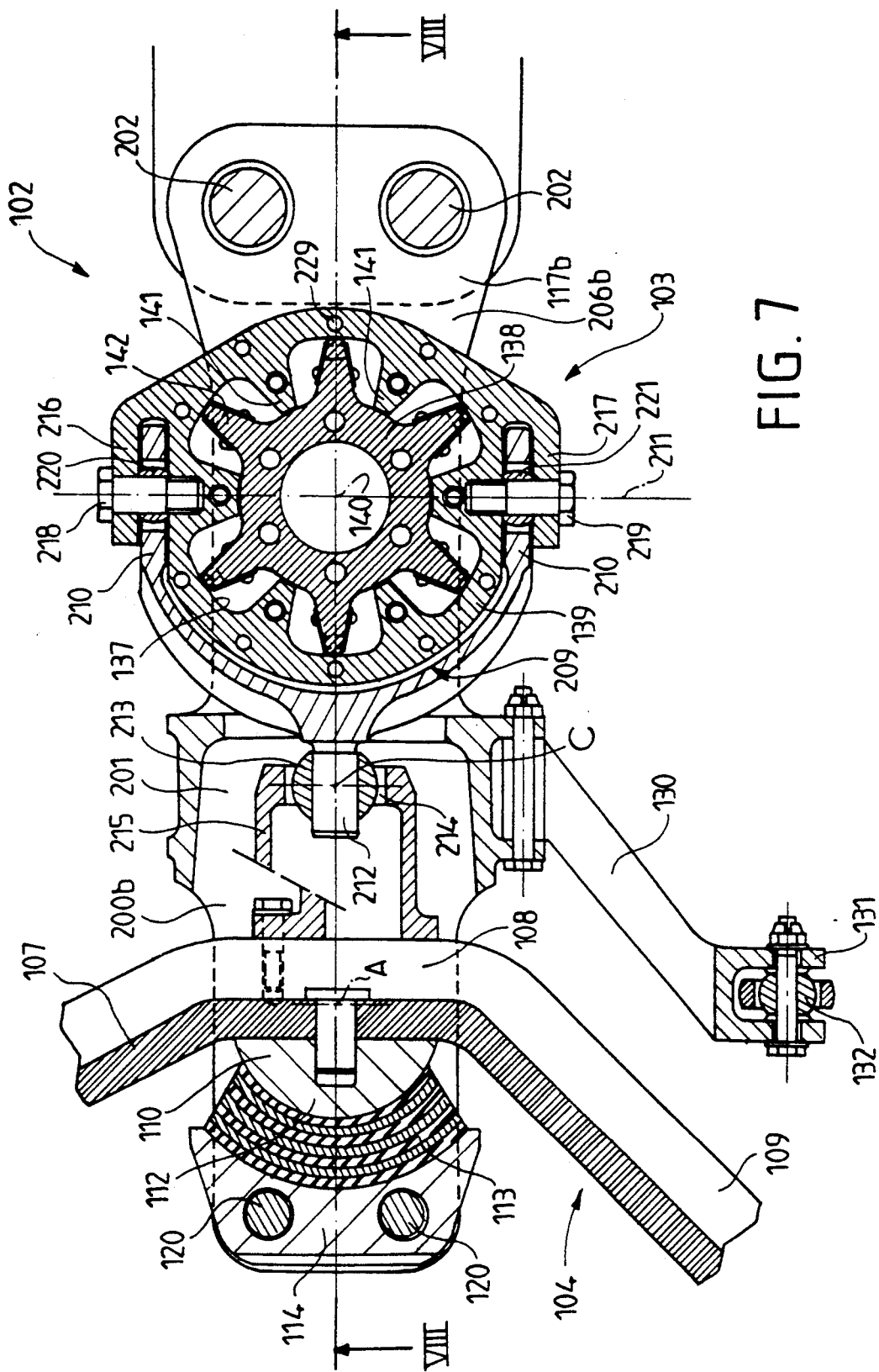
FIG. 7 is a cross-sectional view similar to FIG. 1 of the rotor head according to a second embodiment of the invention.
Figure 8:
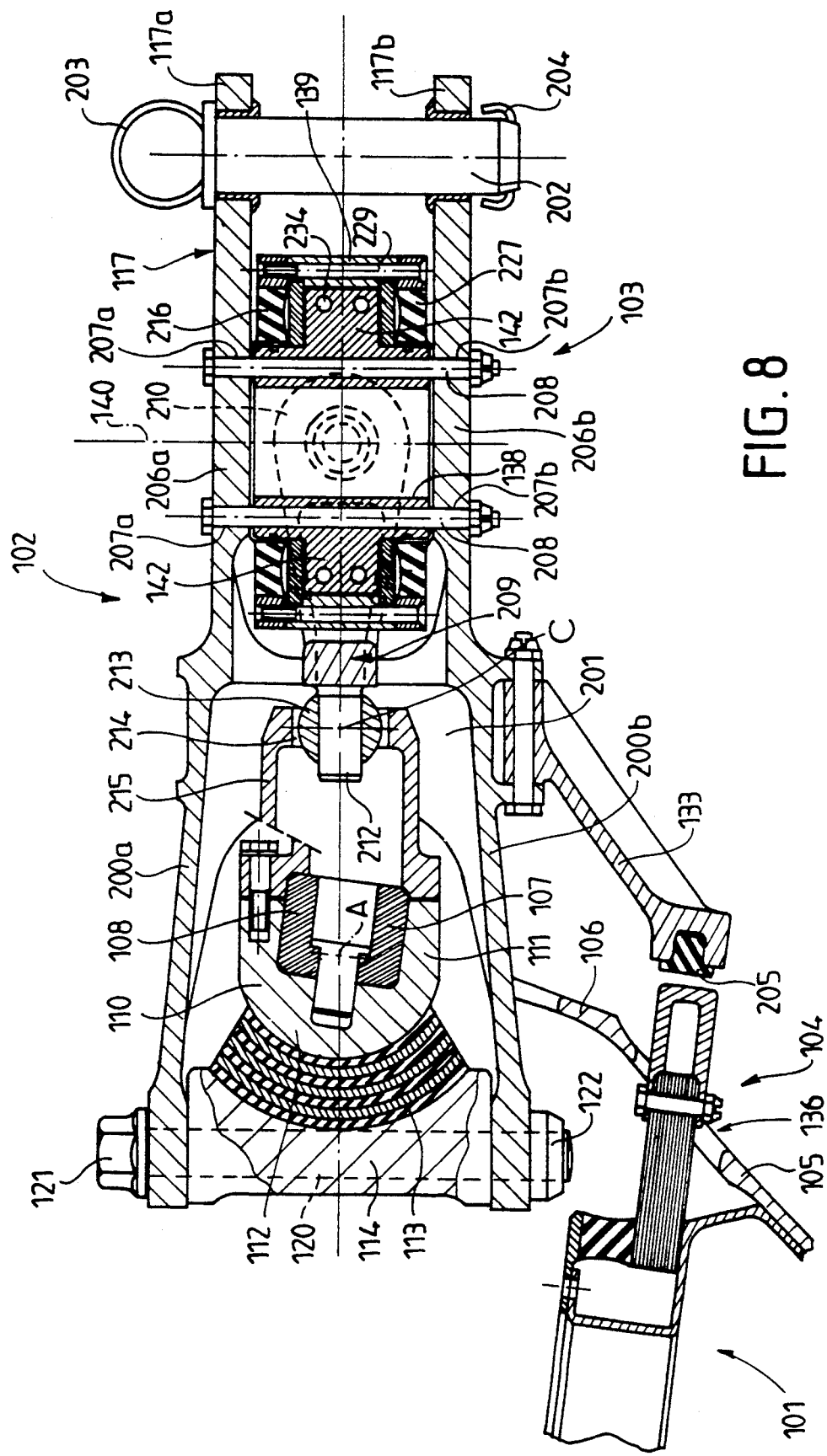
FIG. 8 is a cross-sectional view along the line VIII—VIII of FIG. 7.
Figure 9:
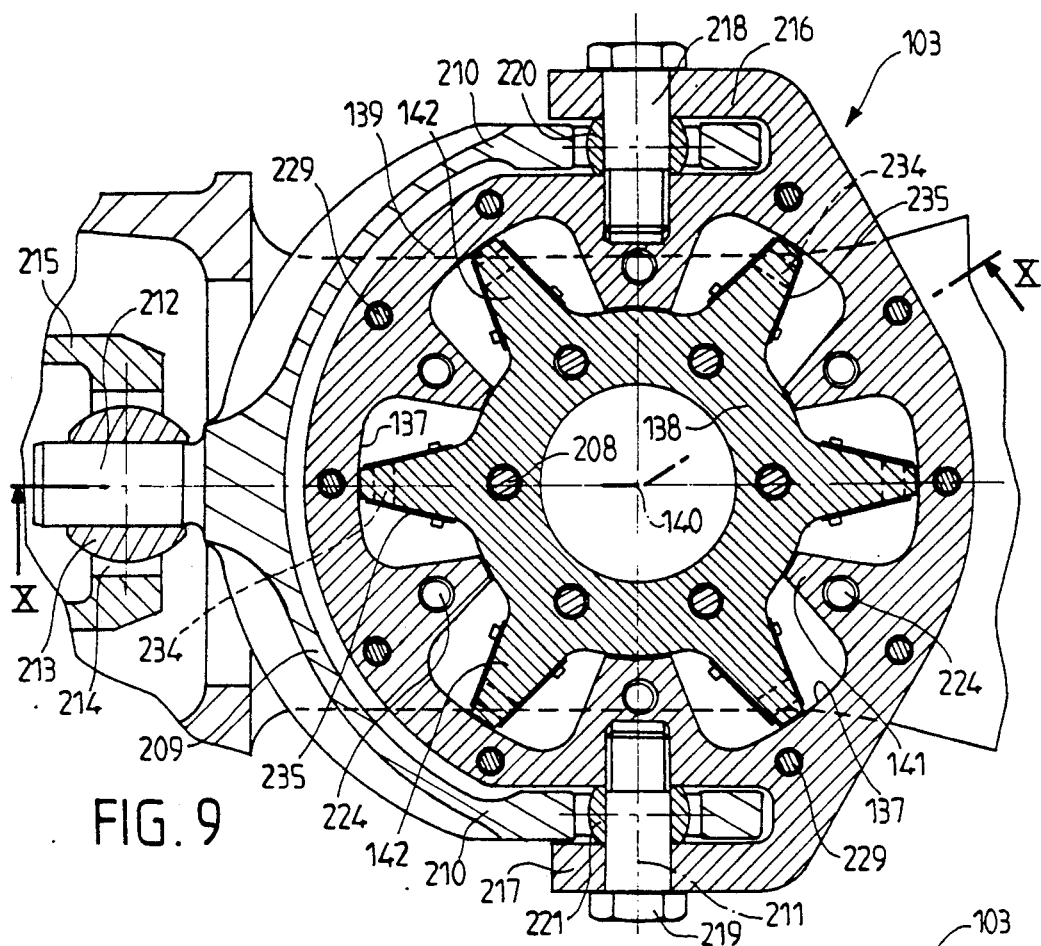
FIG. 9 is a cross-sectional view with cut-aways, in the plane of FIG. 7, of the damping device associated with the attachment piece shown in FIGS. 7 and 8.

Referring to FIGS. 11 and 12, it can be seen that such a rotor head structure is operated in a way which will now be described. During a drag pivoting of the blade and of its attachment piece 102 by an angle $\beta$ about the center A of the laminated spherical thrust bearing 113 in a plane rotating with the rotor of the rotary wing aircraft, the rotor unit 138 pivots through a same angle $\beta$ with said blade about the center A. The axis 140 accompanies this pivoting and passes in the rotating plane from a point B to a point $\beta'$. The ball 213 accompanying the movements of rotation of the hub body 5 about the axis of the rotor of the rotary wing aircraft remains centered on the point C fixed in the plane. Stator unit 139 is articulated on the one hand in a pivoting manner about the axis 140 on the rotor unit 138. On the other hand, the stator is articulated in a pivoting manner about the center of ball 213. The stator pivots in the rotating plane with respect to the center C of the ball by an angle referenced B+ in FIG. 11. The stator unit 139 and the rotor unit 138 will therefore have pivoted with respect to each other by an angle $\beta''$, $\beta'-\beta$, $\beta'$ being in any case greater than $\beta$. This angle $\beta''$ becomes larger as the distance separating the center A of the laminated spherical thrust bearing 113 from the center C of the ball 213, radially to the outside of A, becomes proportionately large compared with the distance separating the center C of ball 213 from the relative pivoting axis 140 of the two units 138 and 139. Furthermore, as indicated by the double arrow in the figure, the pivoting by an angle $\beta$ of the blade about the center A is accompanied by a sliding of the rod 212 in the complementary hollowing in the ball 213 in which the rod 212 is fitted, such that the rotation of the pivoting axis about the point A is compatible with the pivoting of the stator unit 139 by an angle B' about the center C.

As shown in FIG. 12, during a flapping movement of the blade, the attachment piece 102 pivots about the center A driving in this pivoting movement both the rotor unit 138 and the stator unit 139. The stirrup 209 therefore pivots with respect to stator unit 139 so as to accompany this flapping movement. The rod 212 slightly emerges from the hollowing in which it is mounted in the ball 213.

Pitch movements are rendered compatible with the drag movements of the blade and of the attachment piece 102 by the intermediary of balls 220 and 221 about which the arms 210 and 211 of the stirrup 209 are mounted in a diametral pivoting manner on the stator unit 139. These balls 220 and 221 allow a slight shift of the stator unit 139 with respect to stirrup 209. Stator unit 139 can thus pivot about the axis of the blade passing through the point A at the center of the laminated spherical thrust bearing 113 when the point C of the center of the ball 213 is not on this axis. The blade and the attachment piece 102 are off-set in flapping with respect to their rest position shown in FIG. 12; the stirrup 209 remains articulated about said point C, while the stator unit 139 is shifted with respect to stirrup 209 in order to accompany the pitch orientation of the blade.

Other embodiments of a rotor head according to the invention are of course possible. In particular, the blades could be in one piece with their attachment piece; the damping device could be of the rotary type with visco-elastic damping.

I claim:

1. A rotor head for a rotary wing aircraft having a plurality of rotor blades, said rotor head comprising:
   a hub for attaching said plurality of rotor blades thereto, each of said rotor blades being attached to said hub by an attachment assembly, each of said attachment assemblies comprising:
   laminar spherical thrust bearing means attached to said hub for allowing angular oscillations of drag and flapping and pitch orientation of the blade;
   drag damping means coupled between said blade and said hub for damping movements of drag caused by a rotation of said rotor head, said drag damping means comprising first and second hydro-elastic elements, said first and second hydro-elastic elements being pivotable with respect to each other about a common axis,
   wherein said first hydro-elastic element is attached to said hub, and said second hydro-elastic element is attached to said blade, thereby forming an articulation point at said common axis of said first and second hydro-elastic element, and a hydro-elastic effect of said damping means dampens a drag caused by said rotation of said hub, and
   wherein said damping means is disposed to pivot in a flapping direction of said blade through a pivot joint,
   wherein one of the hydro-elastic elements is connected to one of the hub and the blade through a connection means, said connection means being articulated on said one of said hub and said blade through a ball joint, and wherein the connection means is movable with respect to a center of said ball joint.

2. The rotor head recited in claim 1, wherein said pivot joint pivots about an axis which is not parallel to the common axis of the first and second hydro-elastic elements.

3. The rotor head as recited in claim 2, wherein one of said first and second hydro-elastic elements is articulated by said ball joint, and another of said first and second hydro-elastic elements is articulated through said pivot joint which pivots about an axis which is fixed with respect to said hub.

4. The rotor head as recited 3, wherein said axis of said pivot joint is perpendicular to the common axis of the first and second hydro-elastic elements.

5. The rotor head as recited in claim 3, wherein said pivot joint is mounted on said hub, and said ball joint is located on said attachment assembly.

6. The rotor head as recited in claim 2, wherein said first hydro-elastic element is fixed with respect to said hub, and the second hydro-elastic element is articulated on the attachment assembly through said ball joint.

7. The rotor head as recited in claim 6, wherein said second hydro-elastic element is coupled to said connection means which is attached to one of said hub and said attachment assembly by said ball joint and is attached to the other of said hub and said attachment assembly by said pivot joint.

8. The rotor head as recited in claim 1, wherein said connection means is provided with a rod which is movably mounted in a complementary bore, said complementary bore traversing said ball joint.

9. The rotor head as recited in claim 8, wherein each of said attachment assemblies and a corresponding blade is two separate parts, with said blade attaching to said attachment assembly through a fitting of a foot of the blade into an end fork of the attachment assembly, and wherein a base of said fork includes said ball joint disposed therein, said ball joint being capable of pivoting about its center.

10. The rotor head as recited in claim 1, wherein said center of said ball joint is fixed with respect to the blade.

11. The rotor head as recited in claim 1, wherein said connection means comprises a stirrup means which is pivotally attached to said second hydro-elastic elements by arm portions, and attached to said hub by said ball joint.

12. The rotor head as recited in claim 11, wherein said stirrup means is provided with a rod which is fitted into a complimentary bore in said ball joint, said rod being pivotable about the center thereof, said center being fixed with respect to said hub, and said rod being slidably disposed in said complementary bore.

13. The rotor head as recited in claim 11, wherein said stirrup means is movable to allow a slight offset of said arms of said stirrup with respect to a pivoting axis on which said second hydro-elastic unit is attached to said stirrup, said offset compensating for pitch movements of the blade.

14. The rotor head as recited in claim 13, wherein said stirrup means comprises at least two additional ball joints between said arms of said stirrup and said axis of said pivot joint.

15. The rotor head as recited in claim 1, where each blade is attached to said attachment assembly by a foot of the blade being fit into a fork end of the attachment assembly, and wherein the laminar spherical thrust bearing means is mounted between an outer radial brace of the hub and an inner radial brace of the attachment assembly, said inner radial brace comprising a crosspiece between inner radial arms of said attachment assembly.

16. The rotor head as recited in claim 15, wherein said outer brace is mounted on a reinforcing belt surrounding said hub.

17. The rotor head as recited in claim 16, wherein said belt has a U-shaped cross section, and wherein arms of said U-shaped cross section extend from a base of the belt, substantially radial toward an outside of the hub.

18. The rotor head as recited in claim 16, wherein said reinforcing belt has a polygonal contour with rounded angular demarcations, said polygonal contour having small equal sides alternating with large equal sides, said small equal sides carrying said outer braces of the laminar spherical thrust bearing means.

19. The rotor head as recited in claim 18, wherein said outer brace has a substantially U-shaped cross-section, with branches thereof directed radially outwardly from the hub, embedded into a small side of the belt, and wherein said outer brace includes a cover which is integral therewith, said cover closing an open section of the outer brace and said small equal sides of said polygonal contour.

20. The rotor head as recited in claim 19, wherein said cover bears on a shaft of said pivot joint.

21. The rotor head as recited in claim 19, wherein said cover includes a hollow area for receiving said ball joint, said ball joint being capable of pivoting inside said hollow area about a center thereof, said center being fixed with respect to said cover.

22. The rotor head as recited in claim 1, wherein said drag damping means is disposed inside of said attachment assembly.

23. The rotor head as recited in claim 1, wherein one of said first and second hydro-elastic elements is a stator unit having walls which delimit an envelope having a principle shape of resolution, and the other of said first and second hydro-elastic elements is a rotor unit, said rotor unit and said stator being disposed to pivot inside of said relative to each other.

24. The rotor head as recited in claim 23, wherein said stator unit is mounted on said hub, and said rotor unit is disposed on the attachment assembly of a blade.

25. The rotor head as recited in claim 24, wherein relative pivoting movements of said stator unit and said rotor unit are hydro-elastically damped, such that the envelope of the stator unit and the rotor unit delimit a main chamber filled with fluid, and wherein said walls of said stator unit include vanes facing inward and walls of said rotor has vanes facing outward, said vanes corresponding to divide said main chamber into a plurality of volumes, said vanes on said rotor having laminar flow means to allow fluid to flow through the various volumes of the main chamber, and wherein the main chamber is in communication with an auxiliary chamber which has a variable volume, said variable volume for compensation in the volume of the fluid due to expansion thereof.

26. The rotor head as recited in claim 25, wherein said laminar flow means comprises at least one orifice traversing a vane of said rotor, said vane of said rotor having said at least one orifice being located within two vanes of said stator without orifices associated therein.

27. The rotor head as recited in claim 26, wherein one of said vanes is traversed by two orifices whose axes are substantially distributed over a height of said vane.

28. The rotor head as recited in claim 26, wherein each of said vanes associated with said rotor unit is traversed by at least one laminar flow orifice which allows communication between two volumes which are delimited in the main chamber by said vane.

29. The rotor head as recited in claim 25, wherein the laminar flow means includes at least one laminar flow orifice having a spring leaf attached thereto, said spring leaf serving as a clipping valve which closes the orifice in a rest position, and allows the passage of fluid in the orifice above a predetermined differential pressure threshold between two volumes which said vane delimits.

30. The rotor head as recited in claim 25, further comprising two annular rings, said annular rings being integral with said walls of said stator delimiting said envelope, wherein said vanes of said rotor unit are movably relatively disposed with respect to said two annular rings.

31. The rotor head as recited in claim 30, further comprising communication means between the auxiliary chamber and the main chamber, said communication means being disposed between an inside annular edge of one of said angular rings and said rotor unit.

32. The rotor head as recited in claim 30, wherein said auxiliary chamber is delimited by outer surfaces of said annular rings, and by an elastically deformable membrane.

33. The rotor head as recited in claim 32, wherein each of said annular rings is associated with an elastically deformable membrane, said drag damping means being provided with an auxiliary chamber toward each end thereof, said auxiliary chamber being disposed within an outer peripheral portion of the stator and rotor units.

34. The rotor head as recited in claim 32, wherein said elastically deformable membrane has an annular shape.

35. The rotor head as recited in claim 34, wherein an outside annular edge of said elastically deformable membrane is surrounded with an outside ring, wherein said membrane is attached to said ring by vulcanization such that said ring and said membrane are attached in a sealed manner to said stator unit, to prevent fluid leakage.

36. The rotor head as recited in claim 25, wherein said auxiliary chamber is disposed within said rotor unit.

37. The rotor head as recited in claim 36, wherein said auxiliary chamber is delimited by an unrolling membrane mounted on a piston, said piston being biased by a compressed spring, wherein said unrolling membrane can adapt to a volume of said auxiliary chamber based on variations in the volume of hydro-elastic fluid disposed therein, and wherein said spring maintains the drag damping means under a predetermined pressure.

38. The rotor head as recited in claim 37, wherein said unrolling membrane is mounted in a hollowing having a cylindrical shape, said hollowing being coaxial with the stator and the rotor units, said hollowing being sealed to prevent fluid leakage at one end thereof, and said piston being mounted in another end thereof.

39. The rotor head as recited in claim 25, wherein one of said vanes comprises two fins disposed side by side, each of said fins being traversed by two laminar flow orifices such that the orifices of said fins of a vane face each other, wherein one of said orifices is associated with one of a plurality of spring leaves, and said one of said orifices faces an orifice which is not associated with a spring leaf.

40. The rotor head as recited in claim 39, wherein said vanes of said rotor unit each comprise two fins disposed side by side.

41. The rotor head as recited in claim 39, wherein said one of said spring leaves associated with said vane is disposed inside of a space delimited by the two fins forming the vane, with adjacent spring leaves of said plurality of spring leaves being offset in height with respect to each other.

42. The rotor head as recited in claim 23, wherein said attachment assembly further comprises a fork for connection of said attachment assembly to said blade, said rotor unit being disposed between two arms of said fork of said attachment assembly, said two arms being connected to said blade.

43. The rotor head as recited in claim 42, wherein said arms of said fork are integral with said attachment assembly.

* * * * *